United States Patent [19]

Robb

[11] Patent Number: 4,966,448

[45] Date of Patent: Oct. 30, 1990

[54] OPTIMIZED APOCHROMATIC LENS SYSTEMS USING INEXPENSIVE LENS ELEMENTS

[75] Inventor: Paul N. Robb, Sunnyvale, Calif.

[73] Assignee: Lockheed Missiles & Space Company, Inc., Sunnyvale, Calif.

[21] Appl. No.: 379,454

[22] Filed: Jul. 13, 1989

Related U.S. Application Data

[63] Continuation-in-part of Ser. No. 345,793, May 1, 1989, Pat. No. 4,913,535.

[51] Int. Cl.$^5$ .............................. G02B 3/12; G02B 9/60
[52] U.S. Cl. ................................................... 350/418
[58] Field of Search ........................................ 350/418

[56] References Cited

FOREIGN PATENT DOCUMENTS

0017832 of 1899 United Kingdom ................. 350/418
0006194 of 1901 United Kingdom ................. 350/418

*Primary Examiner*—Bruce Y. Arnold
*Assistant Examiner*—Rebecca D. Gass
*Attorney, Agent, or Firm*—John J. Morrissey

[57] ABSTRACT

An apochromatic lens system consisting of four identical glass lens elements and a liquid lens element is disclosed, which has a change in focus of less than one-quarter wavelength over the entire visible spectrum. The glass lens elements and the liquid lens element are made from relatively inexpensive commercially available optical materials.

7 Claims, 9 Drawing Sheets

FIG_1A

FIG_1

FIG_2

FIG_3

FIG_4

FIG_6A

FIG_6

FIG_7

FIG_8

FIG_9

FIG_11A

FIG_11

FIG_12

FIG_13

FIG_14

FIG_15

OPTIMIZED APOCHROMATIC LENS SYSTEMS USING INEXPENSIVE LENS ELEMENTS

The present patent application is a continuation-in-part of U.S. patent application Ser. No. 345,793 filed on May 1, 1989, now U.S. Pat. No. 4,913,535.

TECHNICAL FIELD

This invention relates generally to apochromatic lens systems comprising glass and liquid lens elements, and more particularly to a technique for optimizing performance of such systems.

BACKGROUND OF THE INVENTION

In co-pending U.S. patent application Ser. No. 419,705 filed on Sept. 20, 1982, a technique was disclosed that enables an optical designer to select compatible optical materials for the refractive elements of an optical system that is to be color-corrected at a specified number of wavelengths. A technique disclosed in co-pending U.S. patent application Ser. No. 260,106 filed on Oct. 20, 1988, now abandoned, enables the designer of a lens system that is to be color-corrected at a specified number of wavelengths to include one or more liquid lens elements among the lens elements of the system.

Examples were dislosed in co-pending U.S. patent application Ser. No. 282,665 filed on Dec. 12, 1988 of apochromatic lens triplets of a type in which a liquid lens element is contained between two geometrically identical glass lens elements facing in opposite directions. In co-pending U.S. patent application Ser. No. 345,793 filed on May 1, 1989, examples were disclosed of apochromatic lens systems of a type comprising three identical glass lens elements and a liquid lens element, which coact to achieve a change in focus of less than one-quarter wavelength over the visible spectrum.

SUMMARY OF THE INVENTION

It is an object of the present invention to provide a technique for determining an optimum number of identical glass lens elements to use in designing a lens system that comprises a plurality of identical glass lens elements and a liquid lens element, which glass and liquid lens elements coact with each other to optimize performance and to provide a change in focus of less than one-quarter wavelength over the visible spectrum.

It is a particular object of the present invention to design a lens system comprising a plurality of identical glass lens elements and a liquid lens element, which glass and liquid lens elements are made of commercially available and relatively inexpensive materials that are compatible with each other so as to achieve color correction at three wavelengths with a change in focus of less than one-quarter wavelength over the visible spectrum.

It has been found for three different optical glasses (viz., K5 glass, SK10 glass and BAK1 glass marketed by Schott Optical Glass Inc. of Duryea, Pennsylvania), which are relatively inexpensive optical materials, that:

(1) The use of four indentical glass lens elements, instead of merely three identical glass lens elements as were used in the systems disclosed in the aforementioned co-pending U.S. patent application Ser. No. 345,793, with re-optimization of the geometrical parameters of the design forms previously disclosed for the systems using only three glass lens elements, provides a significant improvement in performance over the performance obtained for systems using only three identical glass lens elements; and (2) The use of more than four identical glass lens elements, even with re-optimization of the geometrical parameters of the design form to accommodate the additional glass lens elements, does not provide a significant improvement in performance over the performance obtained using only four identical glass lens elements.

In accordance with the present invention, an optimum number of glass lens elements was found for each of several different lens systems, each of which comprises a plurality of identical glass lens elements and a liquid lens element. For each lens system using a specified optical glass for the glass lens elements, the optimum number of glass lens elements was determined by comparing a variety of quantitative measures of performance for a basic design form that was re-optimized for each different number of identical glass lens elements used. For the particular optical glasses used in the lens systems described herein, the optimum number of identical glass lens elements was found to be four.

It is not known at the present time whether four is generally the optimum number of identical glass lens elements that should be used for every lens system consisting of a plurality of identical glass lens elements and a liquid lens element. However, for a lens system using any particular type of optical glass for the glass lens elements thereof, the optimum number of identical glass lens elements to use can be determined by comparing one or more quantitative measure of performance, such as:

(1) transverse ray aberration versus aperture height for several different wavelengths in the wavelength range of interest,
(2) change in back focal distance versus wavelength over the wavelength range of interest,
(3) paraxial marginal ray height versus wavelength over the wavelength range of interest,
(4) root-mean-square (RMS) spot radius versus wavelength over the wavelength range of interest, and
(5) the polychromatic modulation transfer function for on-axis rays calculated at several different wavelengths in the wavelength range of interest, for each of several different numbers of identical glass lens elements disposed according to a basic design form that is re-optimized for correspondingly different numbers of identical glass lens elements.

DESCRIPTION OF THE DRAWING

FIG. 10 is a combined plot of the polychromatic modulation transfer function for on-axis rays calculated at the wavelengths indicated in FIG. 7 for the lens system of FIG. 6, and of the polychromatic modulation transfer function for on-axis rays calculated at the same wavelengths for an aberration-free optical system having the same aperture diameter and focal ratio as the lens system of FIG. 6.

BEST MODE OF CARRYING OUT THE INVENTION

Figures 1, 1A, 2:
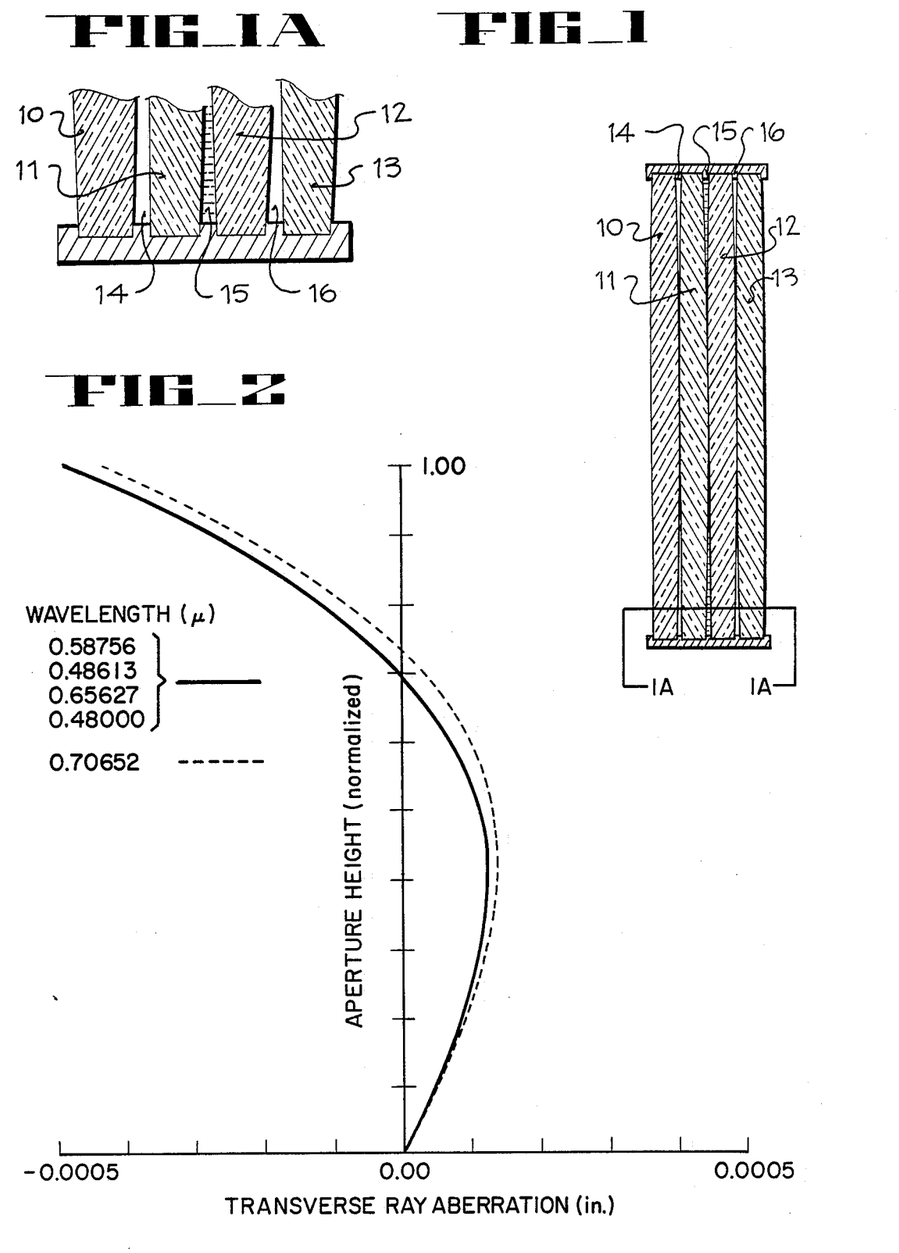
FIG. 1 is a profile drawing of a first embodiment of a lens system according to the present invention.
FIG. 1A is an enlarged view of a peripheral portion of the lens system of FIG. 1.
FIG. 2 is a lot of transverse ray aberration versus aperture height at five different wavelengths for the lens system of FIG. 1.

As illustrated in FIG. 1, a lens system according to the present invention comprises four coaxially positioned and closely spaced lens elements 10, 11, 12 and 13, which are made of an optical glass that is selected primarily for its low cost and for its suitability in mass-production manufacturing operations. An air gap 14 is provided between the glass lens elements 10 and 11, a lens element 15 made of an optical liquid is contained between the glass lens elements 11 and 12, and an air gap 16 is provided between the glass lens elements 12 and 13. Thus, the lens system illustrated in FIG. 1 is a quintuplet (i.e., a five-element lens system).

In the particular lens system illustrated in FIG. 1, the lens elements 10, 11, 12 and 13 are made of K5 optical glass marketed by Schott Optical Glass Inc. of Duryea, Pennsylvania. The liquid lens element 15 consists of an optical liquid marketed by R. L. Cargille Laboratories of Cedar Grove, New Jersey, which has an index of refraction of 1.850 (to three decimal places) at the wavelength of the sodium D spectral line (i.e., 0.5893 micron), and an Abbe number of 17.3 (to the first decimal place). In accordance with the U.S. Mil Spec system, the optical liquid of which the liquid lens element 15 is made is uniquely identified as Cargille 850173 liquid.

The four glass lens elements 10, 11, 12 and 13 are geometrically identical to each other, and both surfaces of each lens element have spherical curvature. A technique disclosed in co-pending U.S. patent application Ser. No. 260,106 can be used for mounting the lens quintuplet of FIG. 1 so that the liquid lens element 15 is contained between the glass lens elements 11 and 12. An enlarged view of a peripheral portion of the lens system of FIG. 1 is shown in FIG. 1A.

The design form (i.e., optical prescription) for the lens quintuplet of FIG. 1 is specified in tabular format for a 10-inch focal length and an f/10 focal ratio as follows:

TABLE I

| Surface No. | Radius (inches) | Thickness (inches) | $N_d$ | $V_d$ | Material |
|---|---|---|---|---|---|
| 1 | 22.9972 | 0.0600 | 1.52249 | 59.48 | K5 |
| 2 | −41.2513 | 0.0005 | | | Air |
| 3 | 22.9972 | 0.0600 | 1.52249 | 59.48 | K5 |
| 4 | −41.2513 | 0.0013 | 1.85044 | 17.35 | 850173 |
| 5 | 41.2513 | 0.0600 | 1.52249 | 59.48 | K5 |
| 6 | −22.9972 | 0.0005 | | | Air |
| 7 | 22.9972 | 0.0600 | 1.52249 | 59.48 | K5 |
| 8 | 41.2513 | 9.9071 | | | Air |
| 9 | (image plane) | | | | | where the surfaces of the lens elements are numbered consecutively from left to right along an optic axis in accordance with optical design convention. Thus, surfaces No. 1 and No. 2 are the left and right surfaces, respectively, of the glass lens element 10, and surfaces No. 3 and No. 4 are the left and right surfaces, respectively, of the glass lens element 11. Surface No. 4 is also the left surface of the liquid lens element 15 contained between the glass lens elements 11 and 12. Surface No. 5 is both the right surface of the liquid lens element 15 and the left surface of the glass lens element 12. Surface No. 6 is the right surface of the glass lens element 12. Surfaces No. 7 and No. 8 are the left and right surfaces, respectively, of the glass lens element 13.

The "radius" listed for each lens surface in Table I is the radius of curvature expressed in inches. In accordance with convention, the radius of curvature is positive if the center of curvature of the surface lies to the right of the surface, and negative if the center of curvature of the surface lies to the left of the surface. The "thickness" listed for each lens surface is the thickness expressed in inches of the lens element bounded on the left by the surface. The thickness of each lens element is measured along the optic axis. The diameter of each lens element is one inch, and the aperture stop for the system is located at surface No. 1.

The column heading "$N_d$" in Table I refers to the refractive index of the lens element bounded on the left by the indicated surface at the wavelength of the sodium d spectral line (i.e., 0.58756 micron). The column heading "$V_d$" in Table I refers to the Abbe number for the lens element bounded on the left by the indicated surface. The "material" listed for each surface in Table I refers to the type of optical material used for the lens element bounded on the left by the indicated surface. Thus, the lens elements 10, 11, 12 and 13 are made of Schott K5 glass, and the lens element 15 is made of Cargille 85.0173 liquid. It is noted that the code designation "850173" for the Cargille liquid used for the liquid lens element 15 uniquely identifies that particular liquid in terms of its refractive index (to within a round-off error in the third decimal place) at the wavelength of the sodium D line (i.e., 0.5893 micron), whereas the refractive index values listed in the column headed $N_d$ in Table I are the values at the wavelength of the sodium d line (i.e., 0.58756 micron).

The refractive index of each optical material varies with wavelength. It is instructive to evaluate the performance of the lens system of FIG. 1 at a number of different wavelengths in order to determine the usefulness of the system for particular applications. The values of refractive index for the optical materials of the lens system of FIG. 1 at five specified wavelengths are as follows:

TABLE II

| Material | $N_1$ | $N_2$ | $N_3$ | $N_4$ | $N_5$ |
| --- | --- | --- | --- | --- | --- |
| K5 | 1.52249 | 1.52860 | 1.51981 | 1.52910 | 1.51829 |
| 850173 | 1.85044 | 1.88456 | 1.83553 | 1.88731 | 1.82722 | where $N_1$ is the index of refraction at the base wavelength of 0.58756 micron, and $N_2$, $N_3$, $N_4$ and $N_5$ are the indices of refraction at specified wavelengths on either side of the base wavelength. Thus, $N_2$ is the refractive index at 0.48613 micron, $N_3$ is the refractive index at 0.65627 micron, $N_4$ is the refractive index at 0.48000 micron, and $N_5$ is the refractive index at 0.70652 micron.

A graphical indication of performance of a lens system is provided by a plot of transverse ray aberration versus aperture height. Plots of transverse ray aberration versus aperture height are given in FIG. 2 for each of the five wavelengths specified in Table II. From the shape of the curves shown in FIG. 2, it is apparent that performance of the lens quintuplet of FIG. 1 is limited by third-order spherical aberration. The closeness of the curves shown in FIG. 2 to each other indicates that the shift in focus of the lens system with respect to wavelength as well as the chromatic variation of spherical aberration of the lens system are substantially negligible.

Figure 3:
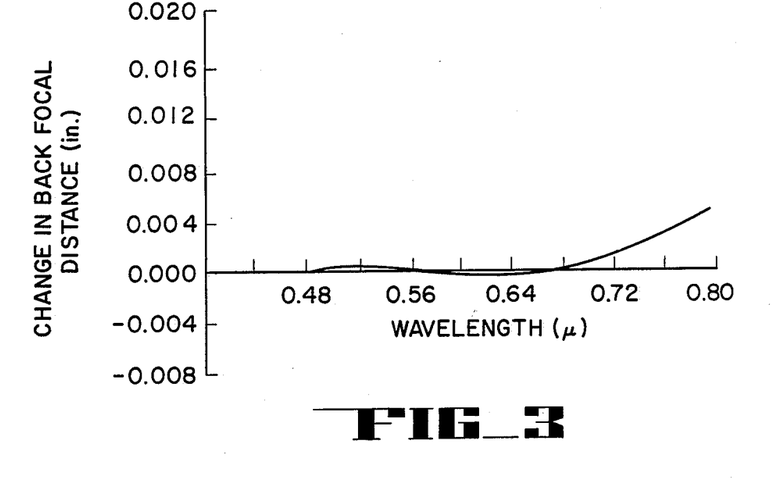
FIG. 3 is a plot of change in back focal distance versus wavelength for the lens system of FIG. 1.

A plot of change in back focal distance versus wavelength is shown in FIG. 3 for the lens quintuplet of FIG. 1. The change in back focal distance as a function of wavelength for a lens system is a measure of the extent of axial chromatic aberration of the system. The three crossings of the horizontal axis by the curve in FIG. 3 indicate that the lens system of FIG. 1 is color-corrected at three wavelengths (i.e., apochromatized).

Rayleigh's criterion for determining the amount of focal shift that can be tolerated for a wavefront passing through a lens system is that not more than one-quarter wavelength of optical path difference should occur over the wavefront relative to a reference sphere centered at a selected image point for the lens system. For a discussion of Rayleigh's criterion, see Warren Smith's text entitled *Modern Optical Engineering*, McGraw-Hill Book Company, Inc., 1966, page 297. The closeness of the curve in FIG. 3 to the horizontal axis throughout the wavelength range extending from approximately 0.48 micron to approximately 0.72 micron indicates that the lens quintuplet of FIG. 1 can be used in that wavelength range without exceeding a depth-of-focus tolerance of one-quarter wavelength in accordance with Rayleigh's criterion.

Figure 4:
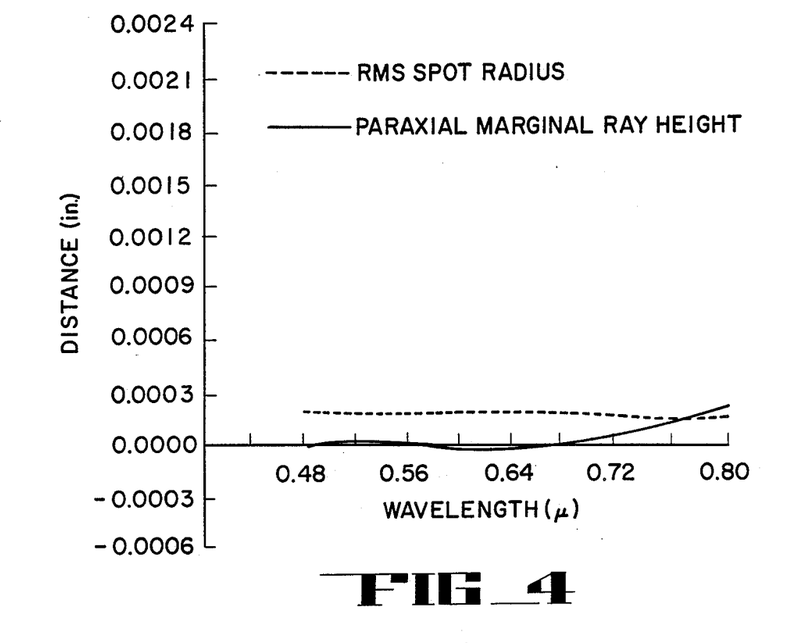
FIG. 4 is a combined plot of paraxial marginal ray height versus wavelength and root-mean-square (RMS) spot radius versus wavelength for the lens system of FIG. 1.

In FIG. 4, paraxial marginal ray height and root-mean-square (RMS) spot radius are plotted as functions of wavelength for the apochromatic lens system of FIG. 1. The variation of paraxial marginal ray height as a function of wavelength on the image plane of a lens system provides an indication of the extent to which the lens system is corrected for axial chromatic aberration. The curve for paraxial marginal ray height versus wavelength shown in FIG. 4 crosses the horizontal axis at three points, which crossing points indicate the three wavelengths at which the lens quintuplet of FIG. 1 brings paraxial marginal rays to a common focus (i.e., the three wavelengths at which color correction is achieved).

The curve for paraxial marginal ray height versus wavelength shown in FIG. 4 has the same shape as the curve for change in back focal distance versus wavelength shown in FIG. 3. The height of the curves in FIGS. 3 and 4 at any given wavelength is a measure of the magnitude of secondary and higher-order chromatic aberration of the lens system of FIG. 1 at that given wavelength. The fact that the curves shown in FIGS. 3 and 4 are very close to the horizontal axis throughout the spectral region from approximately 0.48 micron to approximately 0.72 micron indicates that the lens quintuplet of FIG. 1, as well as being apochromatic, has practically insignificant secondary and higher-order chromatic aberration throughout the visible spectrum.

It is apparent from the curve for RMS spot radius versus wavelength shown in FIG. 4 that the RMS spot radius of the lens system of FIG. 1 is nearly constant over the spectral range extending from approximately 0.48 micron to approximately 0.80 micron. Furthermore, the RMS spot radius for the lens system of FIG. 1 is equal to or less than the radius of the Airy disc for the lens system over the spectral range from approximately 0.48 micron to approximately 0.80 micron. Thus, at a focal length of 10 inches and a focal ratio of f/10, the lens quintuplet of FIG. 1 is diffraction-limited.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. The performance of a system is generally indicated by the ratio of the amplitude of the output to the amplitude of the input, which is conventionally represented by a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

Figure 5:
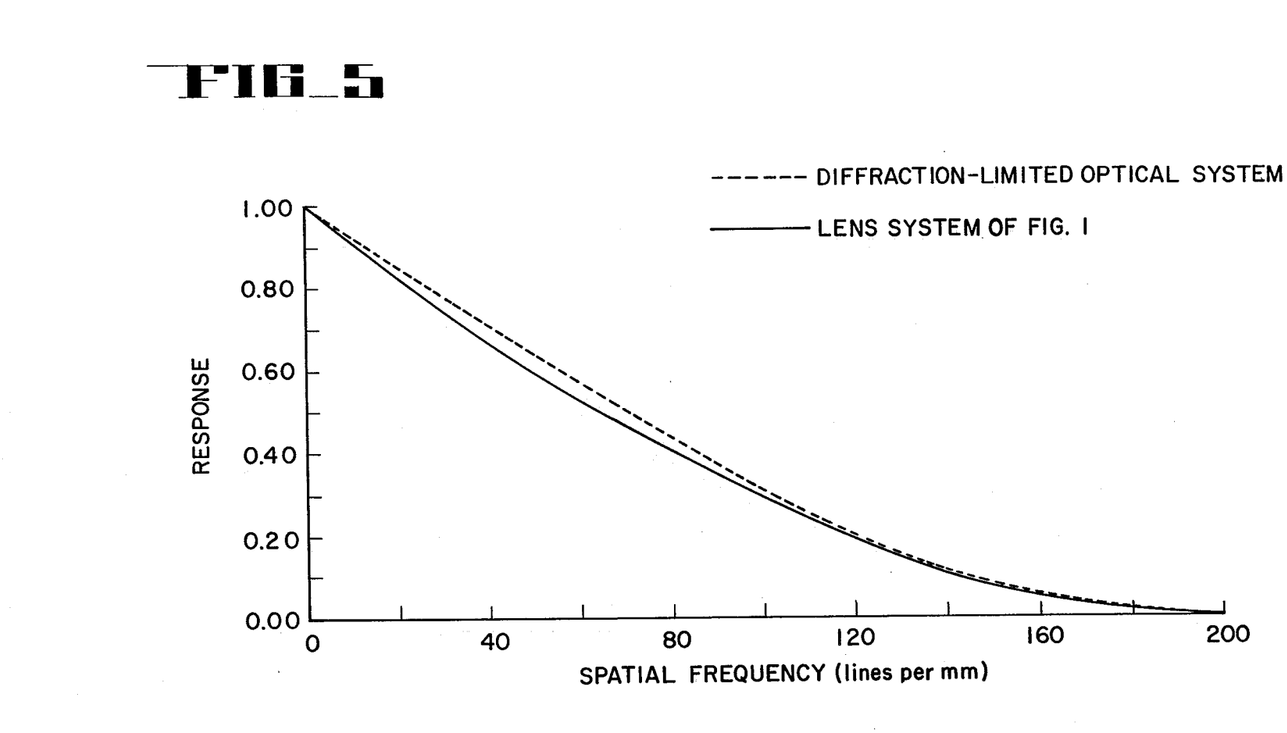
FIG. 5 is a combined plot of the polychromatic modulation transfer function for on-axis rays calculated at the wavelengths indicated in FIG. 2 for the lens system of FIG. 1, and of the polychromatic modulation transfer function for on-axis rays calculated at the same wavelengths for an aberration-free optical system having the same aperture diameter and focal ratio as the lens system of FIG. 1.

In FIG. 5, the solid-line curve is a plot of the polychromatic modulation transfer function for on-axis rays calculated at the five wavelengths listed in Table II for the lens system of FIG. 1. The broken-line curve in FIG. 5 is a plot of the polychromatic modulation transfer function for on-axis rays calculated at the same five wavelengths listed in Table II for an aberration-free optical system of the same aperture diameter and focal ratio. The closeness of the two curves to each other in FIG. 5 indicates that the lens quintuplet of FIG. 1 is substantially diffraction-limited over the spectral range of Table II.

Figures 6, 6A, 7:
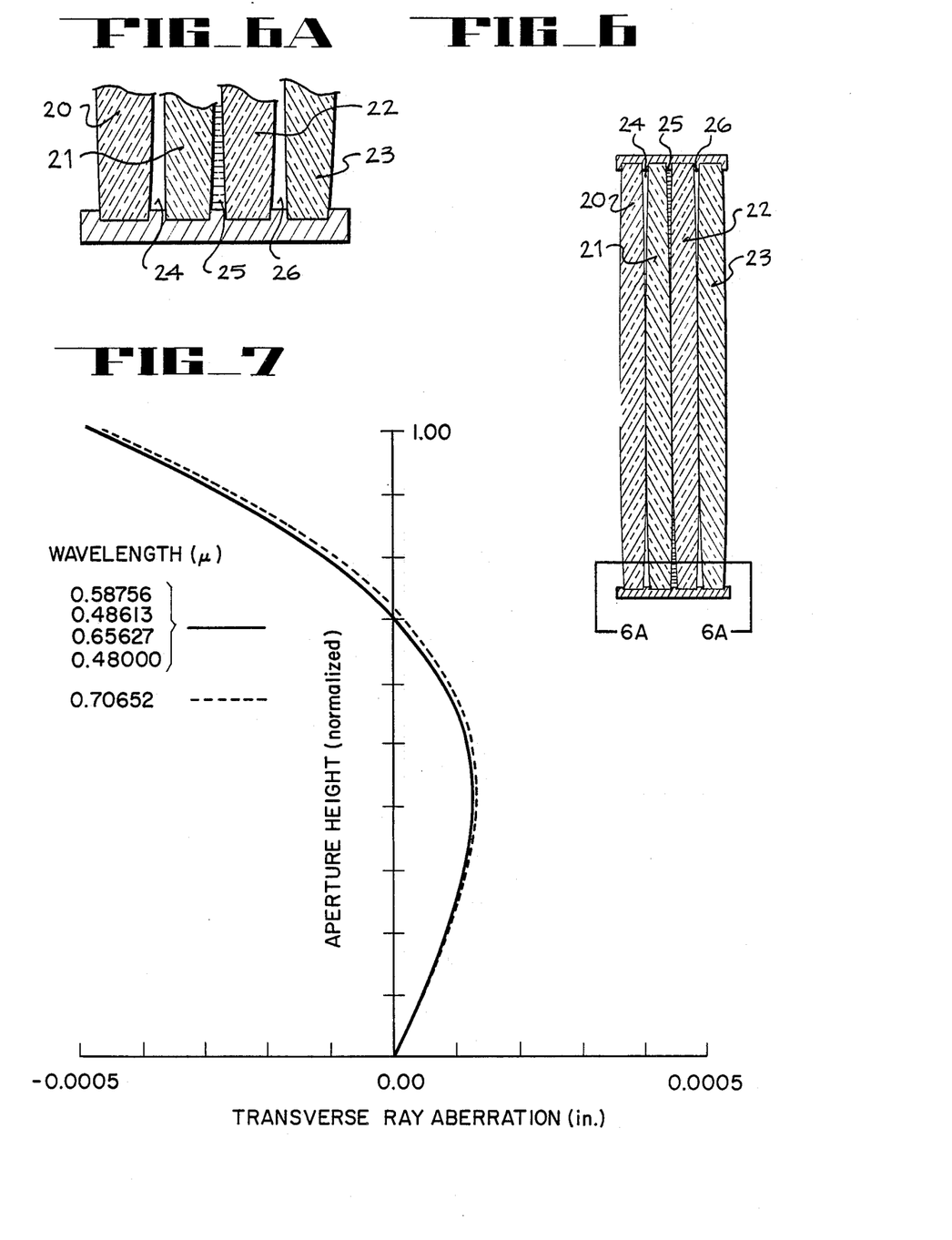
FIG. 6 is a profile drawing of a second embodiment of a lens system according to the present invention.
FIG. 6A is an enlarged view of a peripheral portion of the lens system of FIG. 6.
FIG. 7 is a plot of transverse ray aberration versus aperture height at five different wavelengths for the lens system of FIG. 6.

A second embodiment of a lens system according to the present invention is illustrated in FIG. 6. The lens system of FIG. 6 comprises four closely spaced glass lens elements 20, 21, 22 and 23 disposed coaxially along an optic axis in an appropriate mounting with an air gap 24 between the glass lens elements 20 and 21, a liquid lens element 25 contained between the glass lens elements 21 and 22, and an air gap 26 between the glass lens elements 22 and 23. The glass lens elements 20, 21, 22 and 23 are all made of the same optical material, and are geometrically identical to each other. The lens system of FIG. 6 is thus a quintuplet comprising the four glass lens elements 20, 21, 22 and 23 and the liquid lens element 25. A peripheral portion of the lens system of FIG. 6 is shown in enlarged view in FIG. 6A.

The design form for the lens quintuplet of FIG. 6 is specified in tabular format for a 10-inch focal length and a f/10 focal ratio as follows:

TABLE III

| Surface No. | Radius (inches) | Thickness (inches) | $N_d$ | $V_d$ | Material |
| --- | --- | --- | --- | --- | --- |
| 1 | 31.2116 | 0.0600 | 1.62280 | 56.90 | SK10 |
| 2 | −38.7554 | 0.0005 | | | Air |
| 3 | 31.2116 | 0.0600 | 1.62280 | 56.90 | SK10 |
| 4 | −38.7554 | 0.0013 | 1.85044 | 17.35 | 850173 |
| 5 | 38.7554 | 0.0600 | 1.62280 | 56.90 | SK10 |
| 6 | −31.2116 | 0.0005 | | | Air |
| 7 | 31.2116 | 0.0600 | 1.62280 | 56.90 | SK10 |
| 8 | −38.7554 | 9.9227 | | | Air |
| 9 | (image plane) | | | | | where the surfaces of all the lens elements are spherical and are numbered consecutively from left to right along the optic axis, and where the "radius", "thickness", "$N_d$", "$V_d$" and "material" listed for each of the lens surfaces are defined in accordance with the convention explained above in connection with Table I. The diameter of each lens element is one inch, and the aperture stop for the system is located at surface No. 1.

The glass lens elements 20, 21, 22 and 23 of the lens system of FIG. 6 are made of Schott SK10 glass, which is a relatively inexpensive and readily available optical glass. The liquid lens element 25 is made of Cargille 850173 liquid. The values of refractive index for Schott SK10 glass and Cargille 850173 liquid at the same five wavelengths that were used for evaluating the performance of the lens system of FIG. 1 are as follows:

TABLE IV

| Material | $N_1$ | $N_2$ | $N_3$ | $N_4$ | $N_5$ |
| --- | --- | --- | --- | --- | --- |
| SK10 | 1.62280 | 1.63043 | 1.61949 | 1.63106 | 1.61761 |
| 850173 | 1.85044 | 1.88456 | 1.83553 | 1.88731 | 1.82722 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

In FIG. 7, plots of transverse ray aberration versus aperture height are shown for the five wavelengths indicated in Table IV. However, over the wavelength range from 0.48 micron to about 0.67 micron, the separation between the curves for transverse ray aberration versus aperture height for discrete wavelengths is so small that the curves cannot be distinguished from one another in the scale of FIG. 7. Therefore, in FIG. 7, the curves for the 0.48000 micron, 0.48613 micron, 0.58756 micron and 0.65627 micron wavelengths are represented by a single curve (i.e., the solid curve). The curve for the 0.70652 micron wavelength can be discerned (but just barely) as a separate curve (i.e., the broken curve) in FIG. 7. From the shape of the curves shown in FIG. 7, it is apparent that performance of the lens quintuplet of FIG. 6 is limited by third-order spherical aberration. The closeness of the curves shown in FIG. 7 to each other indicates that the shift in focus of the lens system with respect to wavelength as well as the chromatic variation of spherical aberration of the lens system are substantially negligible.

Figure 8:
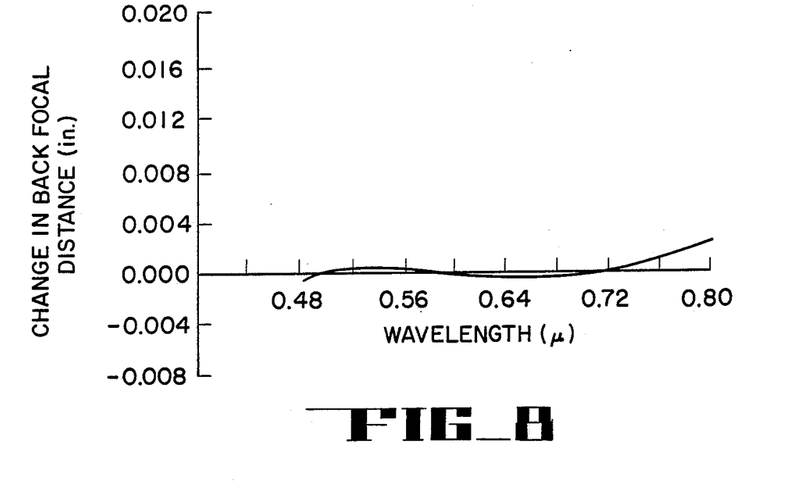
FIG. 8 is a plot of change in back focal distance versus wavelength for the lens system of FIG. 6.

FIG. 8 is a plot of change in back focal distance versus wavelength for the lens system shown in FIG. 6. As indicated by the three crossings of the horizontal axis by the curve in FIG. 8, the lens system of FIG. 6 is apochromatic and has practically insignificant secondary and higher-order chromatic aberration throughout the wavelength range from 0.48 micron to 0.80 micron. The lens system of FIG. 6 can be used without exceeding Rayleigh's depth-of-focus tolerance of one-quarter wavelength over the spectral range from 0.48 micron to 0.80 micron.

Figure 9:
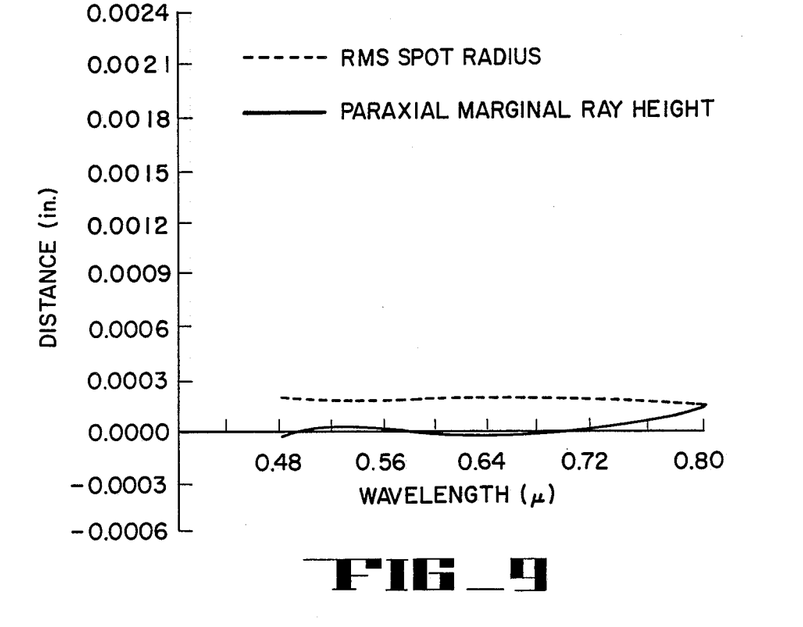
FIG. 9 is a combined plot of paraxial marginal ray height versus wavelength and root-mean-square (RMS) spot radius versus wavelength for the lens system of FIG. 6.

In FIG. 9, paraxial marginal ray height and RMS spot radius are plotted as functions of wavelength at the image plane for the apochromatic lens system of FIG. 6. The curve in FIG. 9 for paraxial marginal ray height versus wavelength has the same shape as the curve in FIG. 8 for change in back focal distance versus wavelength. The fact that the curve for paraxial marginal ray height versus wavelength hugs the horizontal axis throughout the wavelength range extending from 0.48 micron to 0.72 micron indicates that geometrical blur for the lens system of FIG. 6 is practically insignificant over that wavelength range.

The RMS spot radius for the lens system of FIG. 6 is seen from the curve in FIG. 9 to be substantially constant over the wavelength range from 0.48 micron to 0.80 micron. The RMS spot radius is approximately twice the radius of the Airy disc for the lens system of FIG. 6 at a wavelength of 0.48 micron, and is substantially equal to the radius of the Airy disc at a wavelength of 0.80 micron. Thus, the lens system of FIG. 6 is substantially diffraction-limited at wavelengths of 0.80 micron and longer.

In FIG. 10, the solid-line curve is a plot of the polychromatic modulation transfer function for on-axis rays calculated at the five wavelengths listed in Table IV for the lens system of FIG. 6. The broken-line curve in FIG. 10 is a plot of the polychromatic modulation transfer function for on-axis rays calculated at the same five wavelengths listed in Table IV for an aberration-free optical system of the same aperture diameter and focal ratio. The closeness of the two curves to each other in FIG. 10 indicates that the lens system of FIG. 6 is substantially diffraction-limited over the spectral range of Table IV.

Figure 11:
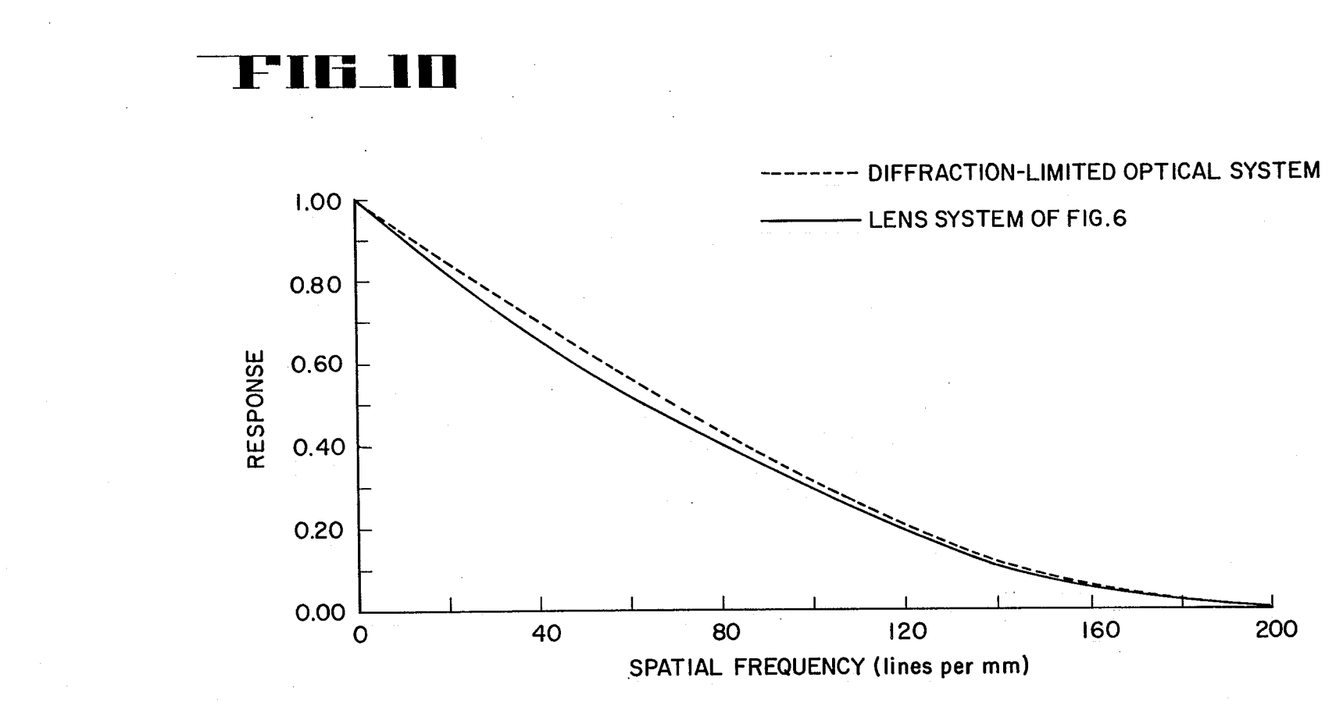
FIG. 11 is a profile drawing of a third embodiment of a lens system according to the present invention.

A third embodiment of a lens system according to the present invention is illustrated in FIG. 11. The lens system of FIG. 11 comprises four closely spaced glass lens elements 30, 31, 32 and 33 disposed coaxially along an optic axis in an appropriate mounting with an air gap 34 between the glass lens elements 30 and 31, a liquid lens element 35 contained between the glass lens elements 31 and 32, and an air gap 36 between the glass lens elements 32 and 33. The glass lens elements 30, 31, 32 and 33 are made of the same optical material, and are geometrically identical to each other. The lens system of FIG. 11 is thus a quintuplet comprising the four glass lens elements 30, 31, 32 and 33 and the liquid lens element 35. A peripheral portion of the lens system of FIG. 11 is shown in enlarged view in FIG. 11A.

The design form for the lens quintuplet of FIG. 11 is specified in tabular format for a 10-inch focal length and an f/10 focal ratio as follows:

TABLE V

| Surface No. | Radius (inches) | Thickness (inches) | $N_d$ | $V_d$ | Material |
|---|---|---|---|---|---|
| 1 | 27.1540 | 0.0600 | 1.57250 | 57.55 | BAK1 |
| 2 | −39.8080 | 0.0005 | | | Air |
| 3 | 27.1540 | 0.0600 | 1.57250 | 57.55 | BAK1 |
| 4 | −39.8080 | 0.0013 | 1.85044 | 17.35 | 850173 |
| 5 | 39.8080 | 0.0600 | 1.57250 | 57.55 | BAK1 |
| 6 | −27.1540 | 0.0005 | | | Air |
| 7 | 27.1540 | 0.0600 | 1.57250 | 57.55 | BAK1 |
| 8 | −39.8080 | 10.0285 | | | |
| 9 | (image plane) | | | | | where the surfaces of all the lens elements are spherical and are numbered consecutively from left to right along the optic axis, and where the "radius", "thickness", "$N_d$", "$V_d$" and "material" listed for each of the lens surfaces are defined in accordance with the convention explained above in connection with Table I. The diameter of each lens element is one inch, and the aperture stop for the system is located at surface No. 1.

The glass lens element 30, 31, 32 and 33 of the lens system of FIG. 11 are made of Schott BAK1 glass, which is also a relatively inexpensive and readily available optical glass. The liquid lens element 35 is made of Cargille 850173 liquid. The values of refractive index for Schott BAK1 glass and Cargille 850173 liquid at the same five wavelengths that were used for evaluating the performance of the lens systems of FIGS. 1 and 6 are as follows:

TABLE VI

| Material | $N_1$ | $N_2$ | $N_3$ | $N_4$ | $N_5$ |
|---|---|---|---|---|---|
| BAK1 | 1.57250 | 1.57943 | 1.56949 | 1.58000 | 1.56778 |
| 850173 | 1.85044 | 1.88456 | 1.83553 | 1.88731 | 1.82722 | where $N_1$ is the refractive index at the base wavelength of 0.58756 micron, and $N_2$, $N_3$, $N_4$ and $N_5$ are the refractive indices at 0.48613 micron, 0.65627 micron, 0.48000 micron and 0.70652 micron, respectively.

Figures 11, 11A, 12:
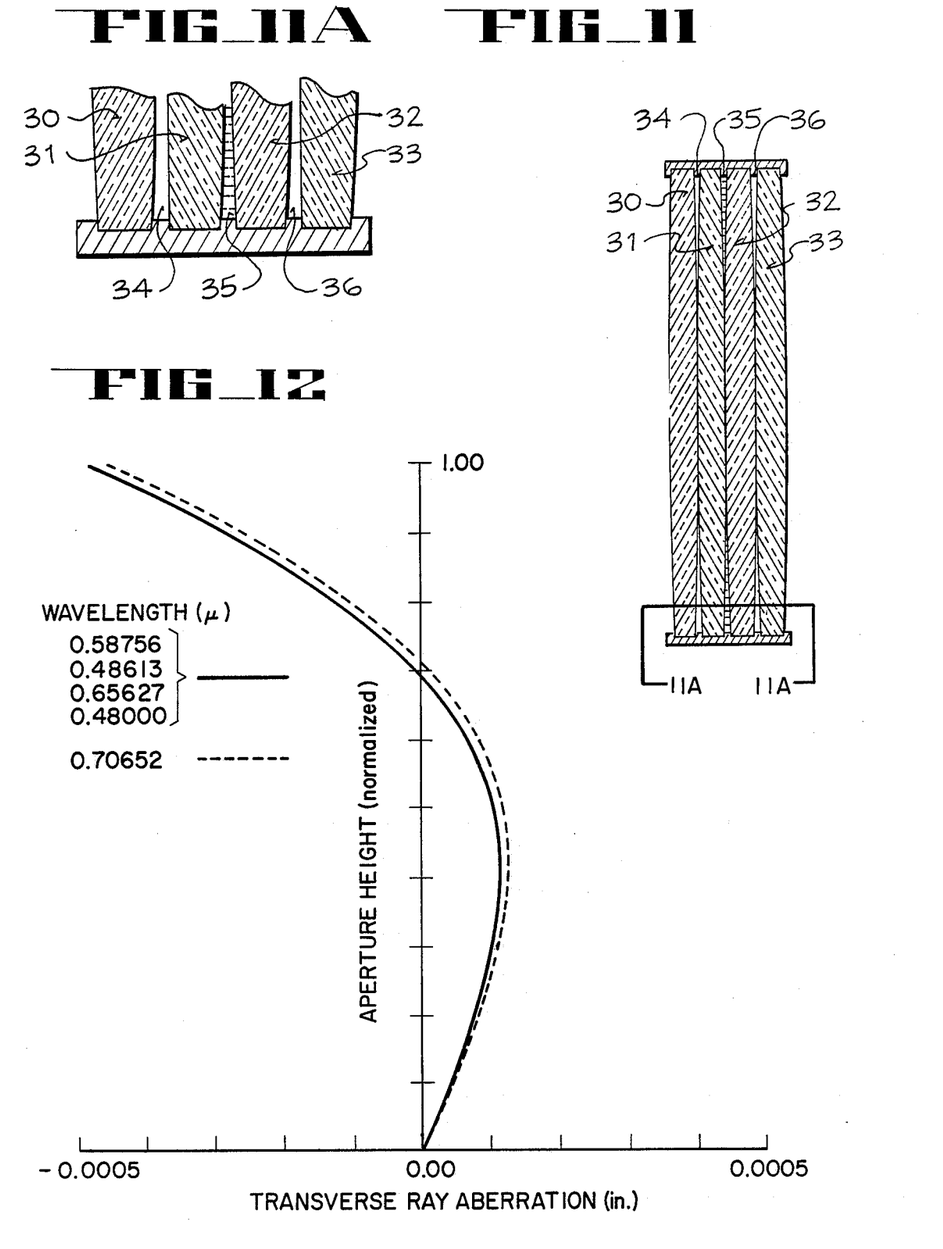
FIG. 11A is an enlarged view of a peripheral portion of the lens system of FIG. 11.
FIG. 12 is a plot of transverse ray aberration versus aperture height at five different wavelengths for the lens system of FIG. 11.

In FIG. 12, plots of traverse ray aberration versus aperture height are given for the five wavelengths indicated in Table VI. However, over the wavelength range extending from 0.48 micron to 0.80 micron, the separation between the curves for transverse ray aberration versus aperture height for discrete wavelengths is so small that the curves cannot be distinguished from one another in the scale of FIG. 12. From the shape of the curves shown in FIG. 12, it is apparent that performance of the lens quintuplet of FIG. 11 is limited by third-order spherical aberration. The closeness of the curves shown in FIG. 12 to each other indicates that the shift in focus of the lens system with respect to wavelength as well as the chromatic variation of spherical aberration of the lens system are substantially negligible.

Figure 13:
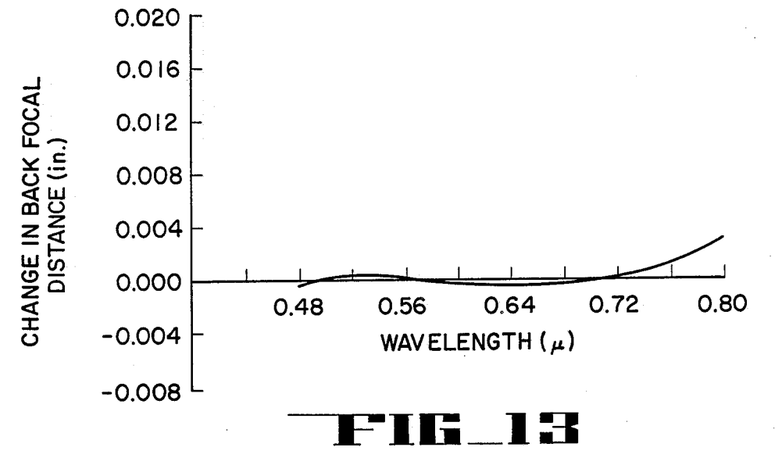
FIG. 13 is a plot of change in back focal distance versus wavelength for the lens system of FIG. 11.

FIG. 13 is a plot of change in back focal distance versus wavelength for the lens system shown in FIG. 11. As indicated by the three crossings of the horizontal axis by the curve in FIG. 13, the lens system of FIG. 11 is apochromatic and has practically insignificant secondary and higher-order chromatic aberration throughout the wavelength range from 0.48 micron to 0.80 micron. The lens system of FIG. 13 can be used without exceeding Rayleigh's depth-of-focus tolerance of one-quarter wavelength over the spectral range from 0.48 micron to 0.72 micron.

Figure 14:
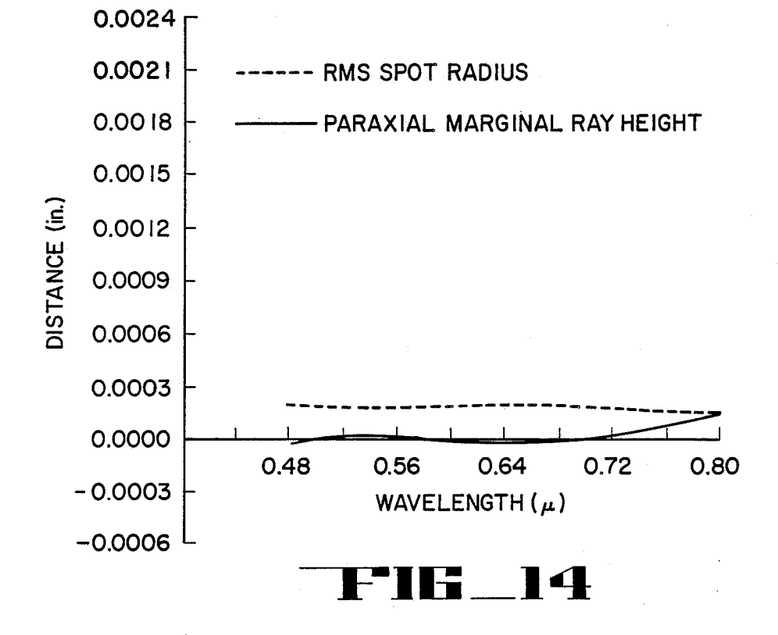
FIG. 14 is a combined plot of paraxial marginal ray height versus wavelength and root-mean-square (RMS) spot radius versus wavelength for the lens system of FIG. 11.

In FIG. 14, paraxial marginal ray height and RMS spot radius are plotted as functions of wavelength at the image plane for the apochromatic lens system of FIG. 11. The curve in FIG. 14 for paraxial marginal ray height versus wavelength has the same shape as the curve in FIG. 13 for change in back focal distance versus wavelength, and indicates that geometrical blur for the lens system of FIG. 11 is practically insignificant over the entire visible spectrum. The RMS spot radius for the lens system of FIG. 11 is substantially constant over the wavelength range from 0.48 micron to 0.80 micron. The RMS spot radius is approximately twice the radius of the Airy disc for the lens triplet of FIG. 11 at a wavelength of 0.48 micron, and is substantially equal to the radius of the Airy disc at a wavelength of 0.80 micron. Thus, the lens system of FIG. 11 is diffraction-limited at wavelengths of 0.80 micron and longer.

Figure 15:
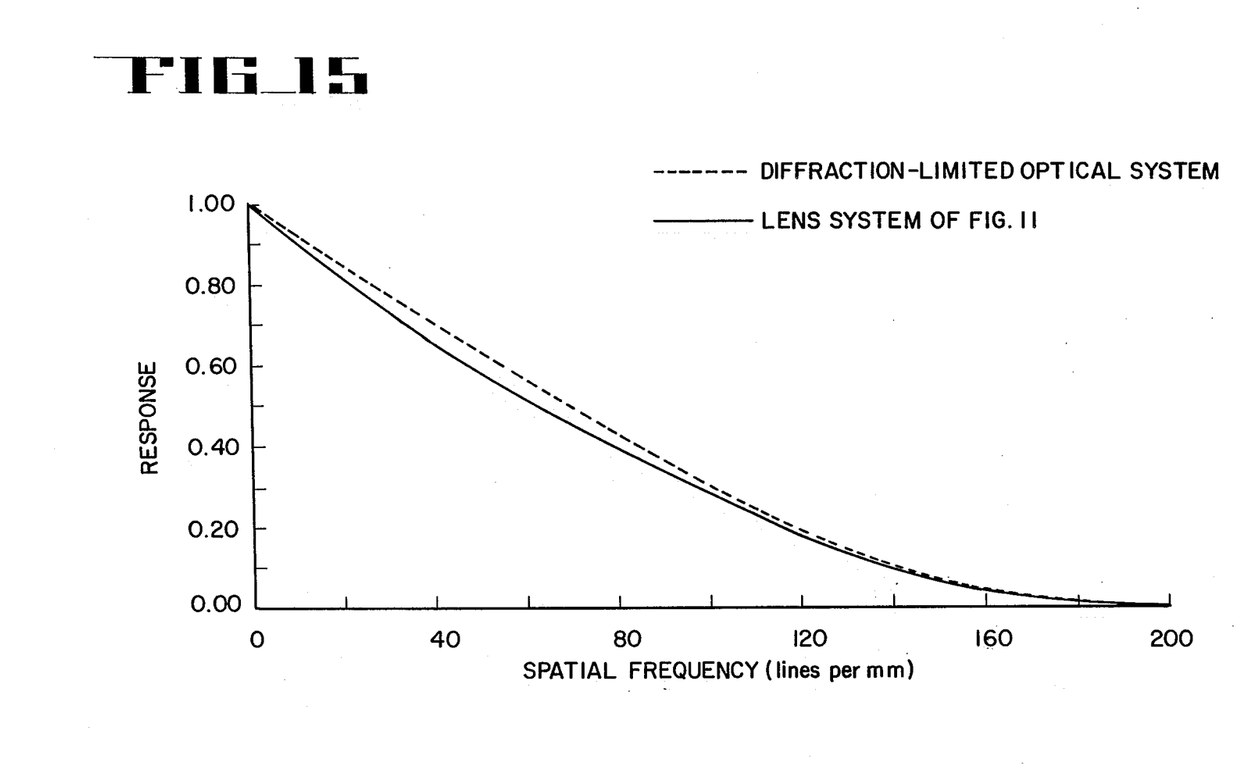
FIG. 15 is a combined plot of the polychromatic modulation transfer function for on-axis rays calculated at the wavelengths indicated in FIG. 12 for the lens system of FIG. 11, and of the polychromatic modulation transfer function for on-axis rays calculated at the same wavelengths for an aberration-free optical system having the same aperture diameter and focal ratio as the lens system of FIG. 11.

In FIG. 15, the solid-line curve is a plot of the polychromatic modulation transfer function for on-axis rays calculated at the five wavelengths listed in Table VI for the lens system of FIG. 11. The broken-line curve in FIG. 15 is a plot of the polychromatic modulation transfer function for on-axis rays calculated at the same five wavelengths listed in Table VI for an aberration-free optical system of the same aperture diameter and focal ratio. The closeness of the two curves to each other in FI. 15 indicates that the lens system of FIG. 11 is substantially diffraction-limited over the spectral range of Table VI.

The present invention has been described above in terms of particular embodiments. However, other embodiments within the scope of the invention would become apparent to practitioners skilled in the art of optical design upon perusal of the foregoing specification and accompanying drawing. Accordingly, the invention is defined more generally by the following claims and their equivalents.

I claim:

1. A lens system comprising four glass lens elements and a liquid lens element disposed coaxially along an optic axis, said liquid lens element being contained between two of said glass lens elements, said four glass lens elements being made of the same kind of glass and being of identical geometrical configuration, said four glass lens elements and said liquid lens element coacting with each other to focus optical radiation passing through said lens system onto a focal surface with a change in focus of less than one-quarter wavelength over a wavelength range from 0.48 micron to 0.72 micron.

2. The lens system of claim 1 wherein said four glass lens elements and said liquid lens element are configured and are positioned with respect to each other on said optic axis so as to cause paraxial marginal rays passing through said lens system to be brought to a common focus at three wavelengths.

3. The lens system of claim 1 wherein said glass lens elements are made from an optical glass selected from among K5 glass, SK10 glass and BAK1 glass.

4. The lens system of claim 3 wherein said liquid lens element is made of an optical liquid that is uniquely characterized by an index of refraction of approximately 1.85044 at a wavelength of 0.58756 micron and by an Abbe number of approximately 17.35.

5. The lens system of claim 1 wherein said four glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 22.9972 | 0.0600 | 1.52249 | 59.48 | K5 |
| 2 | −41.2513 | 0.0005 | | | Air |
| 3 | 22.9972 | 0.0600 | 1.52249 | 59.48 | K5 |
| 4 | −41.2513 | 0.0013 | 1.85044 | 17.35 | 850173 |
| 5 | 41.2513 | 0.0600 | 1.52249 | 59.48 | K5 |
| 6 | −22.9972 | 0.0005 | | | Air |
| 7 | 22.9972 | 0.0600 | 1.52249 | 59.48 | K5 |
| 8 | 41.2531 | 9.9071 | | | Air |
| 9 | (image plane) | | | | | where $N_d$ is the index of refraction at the wavelength of the sodium d spectral line and $V_d$ is the Abbe number at the same wavelength.

6. The lens system of claim 1 wherein said four glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 31.2116 | 0.0600 | 1.62280 | 56.90 | SK10 |
| 2 | −38.7554 | 0.0005 | | | Air |
| 3 | 31.2116 | 0.0600 | 1.62280 | 56.90 | SK10 |
| 4 | −38.7554 | 0.0013 | 1.85044 | 17.35 | 850173 |
| 5 | 38.7554 | 0.0600 | 1.62280 | 56.90 | SK10 |
| 6 | −31.2116 | 0.0005 | | | Air |
| 7 | 31.2116 | 0.0600 | 1.62280 | 56.90 | SK10 |
| 8 | −38.7554 | 9.9227 | | | Air |
| 9 | (image plane) | | | | | where $N_d$ is the index of refraction at the wavelength of the sodium d spectral line and $V_d$ is the Abbe number at the same wavelength.

7. The lens system of claim 1 wherein said four glass lens elements and said liquid lens element are configured and positioned along said optic axis substantially according to an optical prescription as follows:

| Surface No. | Radius (inches) | Thickness (inches) | $N_d$ | $V_d$ | Material |
|---|---|---|---|---|---|
| 1 | 27.1540 | 0.0600 | 1.57250 | 57.55 | BAK1 |
| 2 | −39.8080 | 0.0005 | | | Air |
| 3 | 27.1540 | 0.0600 | 1.57250 | 57.55 | BAK1 |
| 4 | −39.8080 | 0.0013 | 1.85044 | 17.35 | 850173 |
| 5 | 39.8080 | 0.0600 | 1.57250 | 57.55 | BAK1 |
| 6 | −27.1540 | 0.0005 | | | Air |
| 7 | 27.1540 | 0.0600 | 1.57250 | 57.55 | BAK1 |
| 8 | −39.8080 | 10.0285 | | | |
| 9 | (image plane) | | | | | where $N_d$ is the index of refraction at the wavelength of the sodium d spectral line and $V_d$ is the Abbe number at the same wavelength.

* * * * *